(12) United States Patent
Gulwani et al.

(10) Patent No.: US 10,546,055 B2
(45) Date of Patent: Jan. 28, 2020

(54) JOIN WITH FORMAT MODIFICATION BY EXAMPLE

(71) Applicant: Microsoft Technology Licensing, LLC, Redmond, WA (US)

(72) Inventors: Sumit Gulwani, Sammamish, WA (US); Daniel Adam Perelman, Seattle, WA (US); Ranvijay Kumar, Sammamish, WA (US); Euan Peter Garden, Bellevue, WA (US); Chairy Chiu Ying Cheung, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 492 days.

(21) Appl. No.: 15/299,363

(22) Filed: Oct. 20, 2016

(65) Prior Publication Data
US 2018/0113848 A1   Apr. 26, 2018

(51) Int. Cl.
*G06F 17/24* (2006.01)
*G06F 17/21* (2006.01)
*G06K 9/00* (2006.01)

(52) U.S. Cl.
CPC .......... *G06F 17/245* (2013.01); *G06F 17/211* (2013.01); *G06F 17/246* (2013.01); *G06K 9/00463* (2013.01); *G06K 9/00483* (2013.01)

(58) Field of Classification Search
CPC .... G06F 16/254; G06F 16/258; G06F 17/246; G06F 16/252; G06F 16/86; G06F 16/283; G06F 17/245
See application file for complete search history.

(56) References Cited

U.S. PATENT DOCUMENTS

| 6,553,371 | B2 | 4/2003 | Gutierrez-Rivas et al. |
| 6,591,272 | B1 | 7/2003 | Williams |
| 7,350,192 | B2 | 3/2008 | Seitz et al. |
| 7,574,652 | B2 | 8/2009 | Lennon et al. |

(Continued)

OTHER PUBLICATIONS

"Non Final Office Action Issued in U.S. Appl. No. 15/299,388", dated Nov. 14, 2018, 16 Pages.

(Continued)

*Primary Examiner* — Yuk Ting Choi
(74) *Attorney, Agent, or Firm* — Alleman Hall Creasman & Tuttle LLP

(57) ABSTRACT

A computing device is provided comprising a processor configured to select at least one pair of elements, including an element in a source column of the first table and an element in a target column of the second table. The processor may detect that the elements are in different formats. For at least one element, the processor may apply a predetermined mapping to a common format. The processor may modify at least one element to have the same format as the other, and may generate an example including the modified pair. The processor may programmatically generate a script that, when performed on the selected elements, produces a value consistent with the example. For the script with output matching the elements of the target column, the processor may convey the output for display, and may join the tables at least in part by performing the script on the source column.

20 Claims, 6 Drawing Sheets

(56) References Cited

U.S. PATENT DOCUMENTS

| | | | |
|---|---|---|---|
| 8,126,900 | B1 | 2/2012 | Kostamaa et al. |
| 8,538,934 | B2 | 9/2013 | Hudis et al. |
| 8,726,177 | B2 | 5/2014 | Zeringue et al. |
| 9,116,940 | B1 | 8/2015 | Gupta et al. |
| 9,400,639 | B2 | 7/2016 | Kalai et al. |
| 9,507,824 | B2 | 11/2016 | Young et al. |
| 2005/0060292 | A1 | 3/2005 | Day et al. |
| 2005/0060647 | A1 | 3/2005 | Doan et al. |
| 2006/0282429 | A1* | 12/2006 | Hernandez-Sherrington ............... G06F 16/288 707/999.006 |
| 2008/0208855 | A1 | 8/2008 | Lingenfelder et al. |
| 2008/0288444 | A1 | 11/2008 | Edwards et al. |
| 2009/0327208 | A1 | 12/2009 | Bittner et al. |
| 2011/0302553 | A1* | 12/2011 | Gulwani .................. G06F 9/44 717/107 |
| 2011/0320433 | A1 | 12/2011 | Mohiuddin et al. |
| 2012/0005190 | A1 | 1/2012 | Faerber et al. |
| 2013/0166598 | A1 | 6/2013 | Vaitheeswaran et al. |
| 2013/0297661 | A1 | 11/2013 | Jagota |
| 2013/0311443 | A1 | 11/2013 | Bolotnikoff et al. |
| 2014/0236880 | A1 | 8/2014 | Yan et al. |
| 2014/0344399 | A1 | 11/2014 | Lipstone et al. |
| 2014/0344400 | A1 | 11/2014 | Varney et al. |
| 2015/0242407 | A1 | 8/2015 | Frohock et al. |
| 2015/0242409 | A1 | 8/2015 | Frohock et al. |
| 2015/0324346 | A1 | 11/2015 | Sankaran et al. |
| 2016/0055205 | A1* | 2/2016 | Jonathan ........... G06F 16/24537 707/714 |
| 2016/0055212 | A1 | 2/2016 | Young et al. |
| 2016/0171049 | A1* | 6/2016 | Hill .................. G06F 16/24544 707/714 |
| 2016/0224626 | A1 | 8/2016 | Robichaud et al. |

OTHER PUBLICATIONS

Sarawagi, S. et al., "Efficient set joins on similarity predicates," Proceedings of the 2004 ACM SIGMOD international conference on Management of data (SIGMOD '04), Jun. 13, 2004, Paris, France, 12 pages.

Acar, A. et al., "Efficient Discovery of Join Plans in Schemaless Data," Proceedings of the 2009 International Database Engineering & Applications Symposium (IDEAS '09), Sep. 16, 2009, Cetraro, Calabria (Italy), 11 pages.

Jestes, J. et al., "Probabilistic String Similarity Joins," Proceedings of the 2010 ACM SIGMOD International Conference on Management of data (SIGMOD '10), Jun. 6, 2010, Indianapolis, Indiana, 12 pages.

Heer, J. et al., "Predictive Interaction for Data Transformation," Proceedings of the 7th Biennial Conference on Innovative Data Systems Research (CIDR 2015), Jan. 4, 2015, Asilomar, California, 7 pages.

Singh, R. et al., "Predicting a Correct Program in Programming by Example," In Computer Aided Verification, vol. 9206 of the series Lecture Notes in Computer Science, Jul. 16, 2015, 17 pages.

"Understanding Automatic Joins", Retrieved on: Sep. 15, 2016 Available at: http://support.sas.com/documentation/cdl/en/etlug/62233/HTML/default/viewer.htm#n051a3fqzt822kn1xn1rxe2gu6tf.htm.

"Joining Tables", Retrieved on: Sep. 15, 2016 Available at: https://www.zoho.com/reports/help/table/joining-tables.html.

"About joining tables", Retrieved on: Sep. 15, 2016 Available at: https://docs.acl.com/acl/11/index.jsp?topic=%2Fcom.acl.user_guide.help%2Fda_combining_data%2Fc_about_joining_tables.html.

He, et al., "SEMA-JOIN: Joining Semantically-Related Tables using Big Table Corpora" In Proceedings of Very Large Database Endowment, vol. 8, Issue 12, Aug. 31, 2015, pp. 1358-1369.

Singh, et al., "Transforming Spreadsheet Data Types using Examples" In Proceedings of the 43rd Annual ACM SIGPLAN-SIGACT Symposium on Principles of Programming Languages, Jan. 20, 2016, pp. 343-356.

Data Discovery Guide, Retrieved from: <<https://kb.informatica.com/proddocs/Product%20Documentation/5/IN_101_DataDiscoveryGuide_en.pdf>>, Jun., 2016, 199 Pages.

"International Search Report and Written Opinion Issued in PCT Application No. PCT/US2017/056443", dated Feb. 26, 2018, 13 Pages.

"International Search Report and Written Opinion Issued in PCT Application No. PCT/US2017/056444", dated Feb. 26, 2018, 10 Pages.

"Non Final Office Action Issued in U.S. Appl. No. 15/299,404", dated Apr. 8, 2019, 24 Pages.

* cited by examiner

JOIN WITH FORMAT MODIFICATION BY EXAMPLE

BACKGROUND

When using computer programs that involve the manipulation of tables of data, joining two tables is a common task for a user to perform. If the data in the two tables are in different formats, it becomes time-consuming and cumbersome for the user to write a script to join them. These challenges, the manner in which they are addressed, and the attendant potential beneficial technical effects thereof are further discussed below.

SUMMARY

According to one aspect of the present disclosure, a computing device for computing join potential between a first table and a second table is provided comprising a processor configured to select at least one pair of elements. Each pair includes an element in a source column of the first table and an element in a target column of the second table. For each pair, the processor may be configured to detect that the elements in the pair are in different formats. For at least one of the elements, the processor may be further configured to apply a predetermined mapping from a first format of a first element in the pair to a common format defined by the predetermined mapping. The processor may modify at least one of the elements so that it is in the same format as the other to facilitate generating corresponding matches between the source and target columns. In addition, the processor may generate an example that includes the pair of elements after at least one of the elements has been modified. For each example, the processor may be configured to programmatically generate a script based on the example that, when performed on one of the selected elements, produces a value that is consistent with the other of the selected elements of the example. For each script, the processor may be further configured to apply that script to other elements in the source column and determine that an output generated by that script is in the target column. For the script for which the generated output meets a selected matching criterion when compared to the elements of the target column, the processor may convey the output generated by that script for display on a display device, and in response to an input signal accepting the conveyed script, the processor may perform a join operation on the two tables at least in part by performing the conveyed script on the source column.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
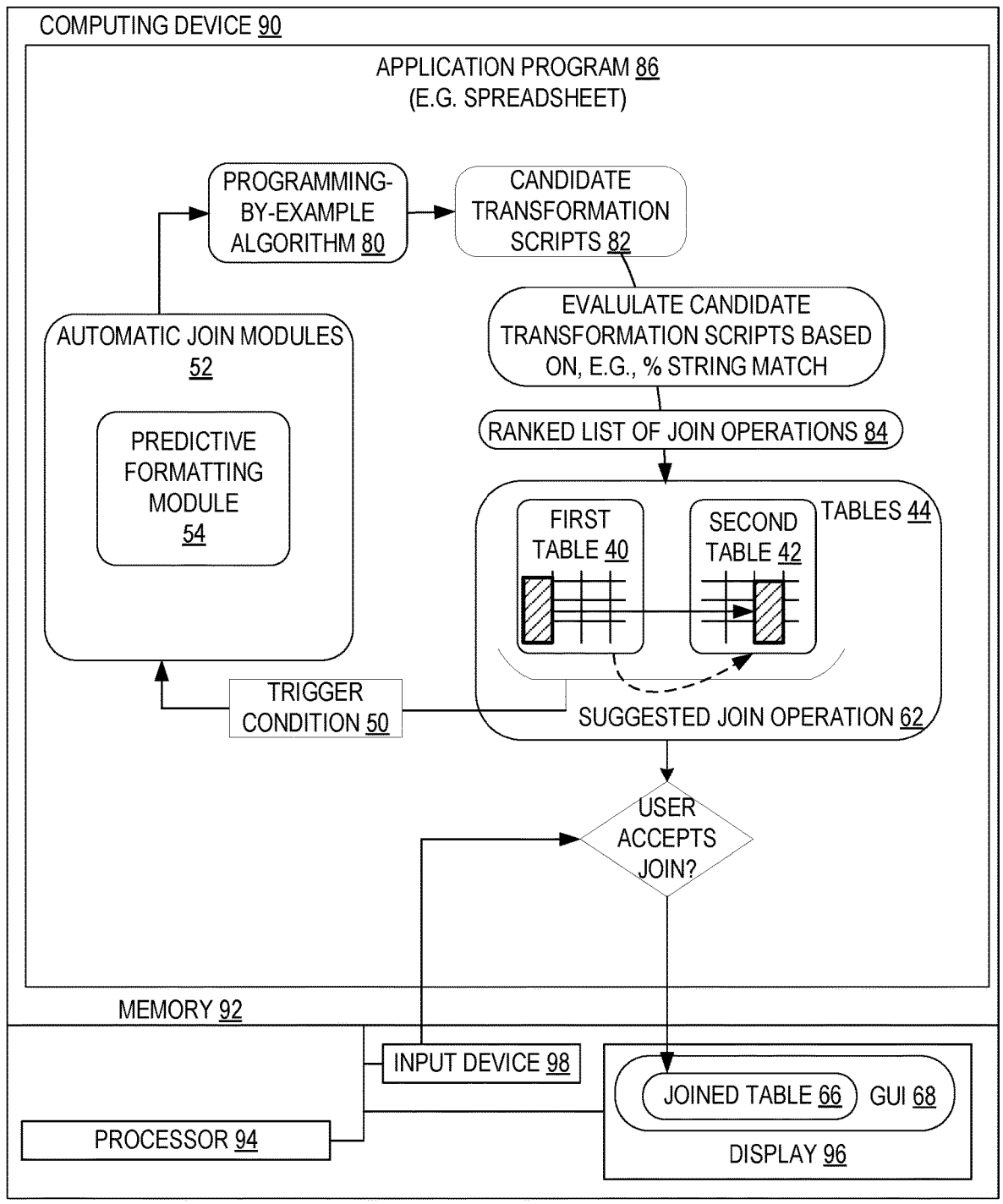
FIG. 1 shows a computing device equipped with a predictive formatting module that programmatically computes the join potential between at least two tables, according to one embodiment of the present disclosure.

FIG. 1 illustrates a computing device 90 for computing join potential between a first table 40 and a second table 42, comprising memory 92, a processor 94, a display 96, and an input device 98. The processor 94 is configured to execute an application program 86, contained in the memory 92 that computes a join potential between two tables 44, according to one embodiment of the present disclosure. The processor 94 may be configured to compute join potential between the first table 40 and the second table 42 in response to detecting a trigger condition 50. The application program 86, for example, may be a spreadsheet application program 86, and the trigger condition 50, for example, may be a user selecting a "search for potential joins" option in the spreadsheet application program 86, or may be a programmatic trigger that causes the application program 86 itself to search for potential joins among tables 44 without requiring user input.

In response to a trigger condition 50, the computing device 90 executes an automatic join module 52 on a first table 40 and a second table 42. The automatic join module 52 includes a predictive formatting module 54. The predictive formatting module 54 programmatically generates at least one candidate transformation script 82. The processor 94 may be configured to programmatically generate the script 82 using a programming-by-example algorithm 80. The predictive formatting module 54 then evaluates the at least one candidate transformation script 82 and produces a ranked list of join operations 84. At least one suggested join operation 62 from the ranked list of join operations 84 is then conveyed for display on a display device 96. In response to an input signal accepting one of the suggested join operations 62, the application program 86 joins the tables 44 into a joined table 66, which is conveyed for display in a graphical user interface 68 on display 96.

Figure 2:
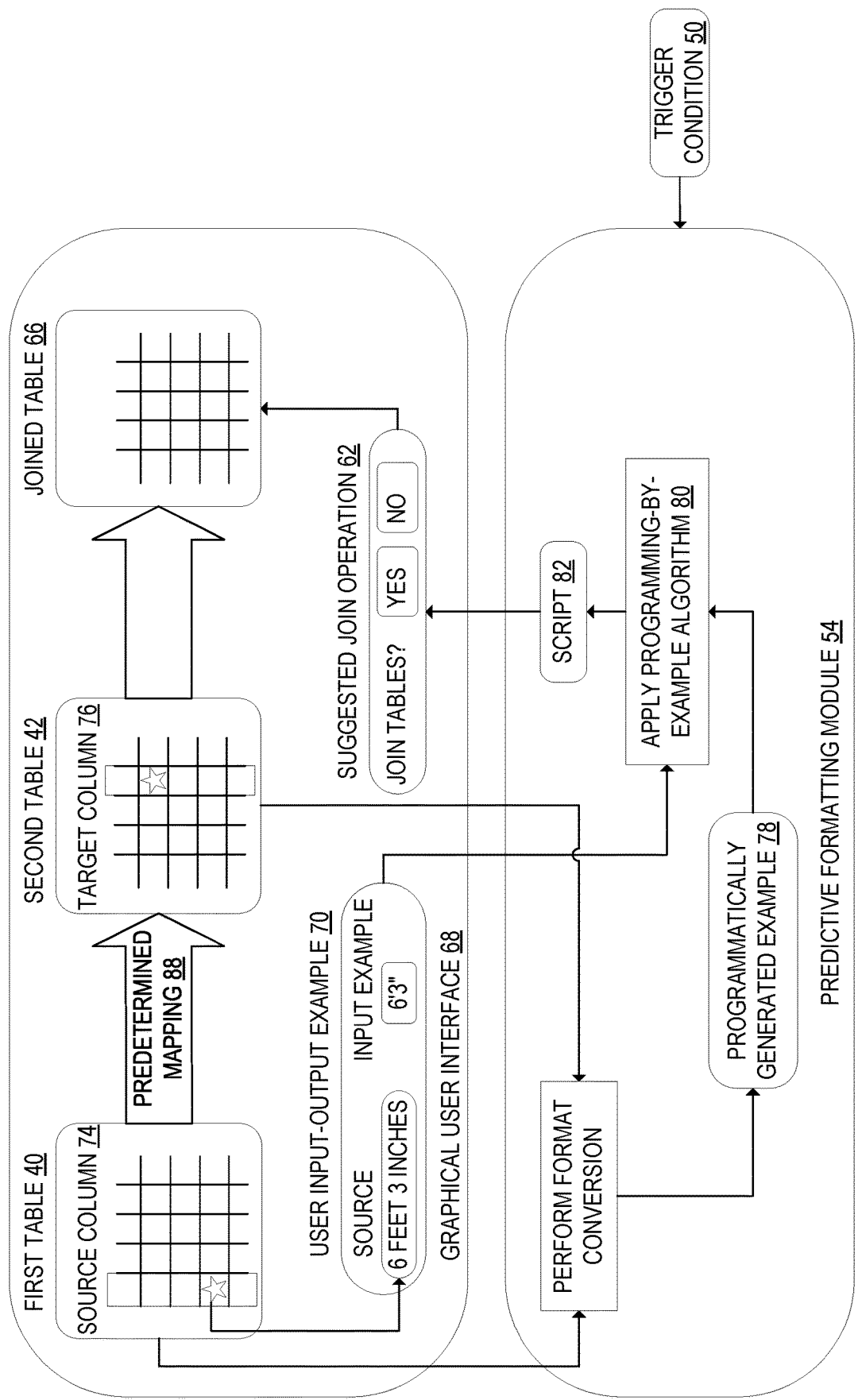
FIG. 2 shows the predictive formatting module of FIG. 1 and the graphical user interface with which a user inputs data into and views data output by the predictive formatting module.

FIG. 2 illustrates the predictive formatting module 54 and the graphical user interface 68. The predictive formatting module 54 is configured to detect a trigger condition 50 for computing join potential between a first table 40 and a second table 42. From these two tables 44, the predictive formatting module 54 selects at least one pair of elements, wherein each pair includes an element in a source column 74 of the first table 40 and an element in a target column 76 of the second table 42.

In order for the predictive formatting module 54 to directly compare two elements, the predictive formatting module 54 converts those elements into a common data type. To determine whether two elements that may be in different formats contain any of the same information, the predictive formatting module 54 may convert both elements into strings and may determine whether they share any substrings. Converting the elements to strings, rather than to some other data type, offers some advantages. First, strings can contain any type of characters, whereas other data types such as integer can only contain certain character types. Also, strings can be divided into substrings that still have the string data type. These substrings can be compared directly to each other. Thus, converting the element in the source column 74 and the element in the target column 76 to strings allows the contents of the elements to be compared even if the elements did not initially share a data type.

The process by which the element in the source column 74 of the first table 40 and the element in the target column 76 of the second table 42 are modified to be in a common format is as follows. The predictive formatting module 54 performs a format conversion on each selected pair of elements. First, the predictive formatting module 54 detects that the elements in the pair are in different formats. For at least one of the elements, the predictive formatting module 54 applies a predetermined mapping 88 from a first format of a first element in the pair to a common format defined by the predetermined mapping 88.

The predictive formatting module 54 may modify at least one of the elements of the pair so that it is in the same format as the other. This modification may be performed at least in part by converting the pair of elements into a converted pair of strings. The predictive formatting module 54 may then modify at least one of the elements so that it is in the same format as the other using a common format map. For example, the common format map may insert or remove delimiters, capitalize or decapitalize letters, change the time zone of a time, or round a number.

The common format map may take as inputs the format of the element in the source column 74 and the format of the element in the target column 76 and map these inputs to a common format. The common format is not necessarily the same as the format of either of the elements of the pair. The format output by the common format map may be different from the format of the element in the source column 74 and the format of the element in the target column 76. According to one embodiment of the present disclosure, the common format is selected from the group consisting of string representations of various standard formats for entities such as number, date, time, name, address, email address, and distance. The predictive formatting module 54 programmatically generates an example 78 that includes the pair of elements after at least one of the elements has been modified.

For each example 78, the predictive formatting module 54 programmatically generates a script 82 based on the example 78 that, when performed on the input-output selected pair 100 of the example 78, produces a value that is consistent with the input-output example pair 102. A script is defined as a set of programmatic instructions to be executed by a computing device 90.

The predictive formatting module 54 of the present disclosure makes use of programming by example. Programming by example is a programming technique by which a script is generated from an example of the desired output of such a script. For example, programming by example is used in the flash-fill feature of Microsoft Excel 2016. In the programming by example techniques employed herein, the example may be input by a user or may be programmatically generated by predictive data formatting module 54.

Figure 3:
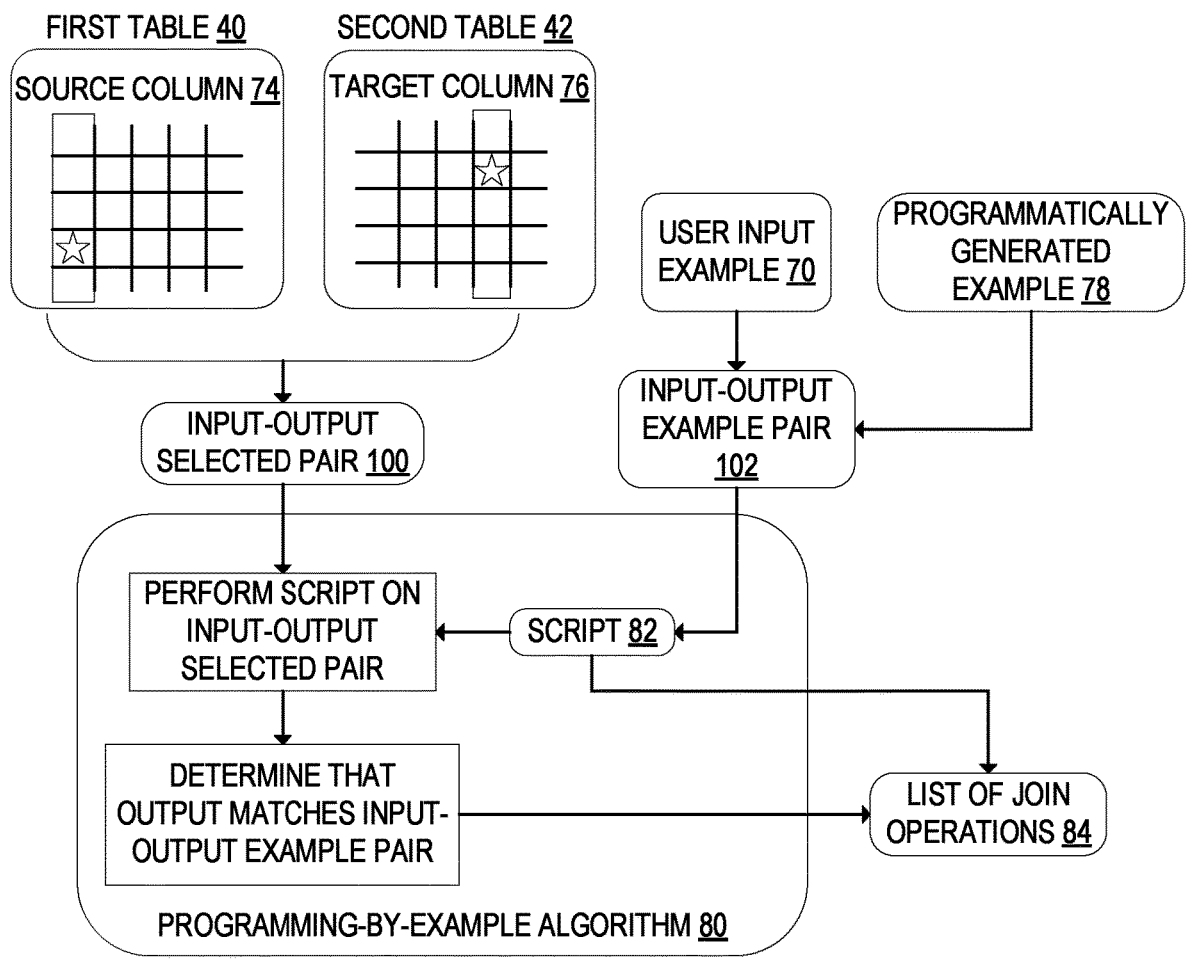
FIG. 3 shows the programming-by-example algorithm of FIG. 3 and its inputs and outputs.

FIG. 3 illustrates the programming-by-example algorithm 80. First, the predictive formatting module 54 inputs an input-output example pair 102 into a programming-by-example algorithm 80. The input-output example pair 102 may be a programmatically generated example 78 or a user input example 70. For each input-output example pair 102 generated by the method described above, the predictive formatting module 54 uses a programming-by-example algorithm 80 to generate a script 82 that, when performed on the selected elements of the source column 74, produces the input-output example pair 102. The programming-by-example algorithm 80 may be configured to receive an input-output selected pair 100 and an input-output example pair 102. The programming-by-example algorithm 80 may then synthesize a script 82 that, when performed on the input-output selected pair 100, produces the input-output example pair 102.

Once a script 82 has been generated, the programming-by-example algorithm 80 may perform the script 82 on various other inputs in the source column 74 and compare the output of the script to elements in the target column 76. The programming-by-example algorithm 80 may determine the relative coverage of the elements of the target column 76, the proportion of outputs of the script 82 that match elements of the target column 76. If many of those outputs belong to the target column 76, the script 82 may be added to a list of join operations 84. The scripts in the list of join operations 84 may be ranked by probability of producing a successful join operation and conveyed for display to the user.

In place of the programmatically generated example 78, the programming-by-example algorithm 80 may instead use a user input example 70 to generate the script 82. The input-output example pair 102 may be input by a user or may be programmatically determined.

If the input-output example pair 102 is programmatically determined, the determination may be made by at least the following process. First, for at least one element in the source column 74 of the first table 40, the programming-by-example algorithm 80 may convert that element into a converted string. Second, for at least one element in the target column 76 of the second table 42, the programming-by-example algorithm 80 may also convert that element into a converted string. Then, the programming-by-example algorithm 80 may determine the converted string in the target column 76 that meets a selected matching criterion when compared to the converted string in the source column 74. This determination may be made at least in part by using a matching criterion such as a string distance metric, for example, a comparison of substring length. The programming-by-example algorithm 80 may make this determination at least in part by determining a pair including the converted string in the source column 74 and the converted string in the target column 76 with a longest substring match. Finally, the programming-by-example algorithm 80 may generate an example pair that includes the converted string in the source column 74 and the converted string in the target column 76 that meets a selected matching criterion when compared to the converted string in the source column 74.

For each script 82, the predictive formatting module 54 applies that script 82 to other elements in the source column 74 and determines that an output generated by that script 82 is in the target column 76. The scripts are then ranked by how many of their outputs when applied to the source column 74 match the elements in the target column 76.

An example of the determination of the script 104 for which the generated output meets a selected matching criterion when compared to the element in the target column 76 is provided below. The columns of the first table 40 are Roll Number (integer) and GPA (real). The columns of the second table 42 are GPA (integer) and Grade (string). In the first table 40, the elements of the GPA column are of a data type that is real number, whereas in the second table 42 they are of a data type that is integer. The GPA (real) column of the first table 40 is the source column 74, and the GPA (integer) column of the second table 42 is the target column 76.

| Roll Number (integer) | GPA (real) |
|---|---|
| 1 | 4.1 |
| 2 | 3.5 |

| GPA (integer) | Grade (string) |
|---|---|
| 4 | 'A' |
| 3 | 'B' |
| 2 | 'C' |
| 1 | 'F' |

Consider each example pair including an element from the source column 74 and an element from the target column 76 that can be produced if the selected element of the source column 74 is "4.1." First, the predictive formatting module 54 converts "4.1," the selected element of the source column 74, into a converted string. Next, the predictive formatting module 54 converts at least one element in the target column 76 into a converted string. In this example, it converts each element in the target column 76 into a converted string.

Next, the predictive formatting module 54 determines the pair including the converted string in the source column 74 and the converted string in the target column 76 with a longest substring match. The converted string "4.1" does not share any substrings with the converted strings "2" or "3," so the elements "2" and "3" in the target column 76 are not used to form input-output example pairs 102. On the other hand, "4.1" shares a substring one character in length with "1," and also shares a substring one character in length with "4."

The programming-by-example algorithm 80 produces two scripts 82, one corresponding to each of the input example pairs 102. The first script maps 4.1 to 1 by taking the content after the period. The second script maps 4.2 to 4 by taking the string before the period.

The programming-by-example algorithm 80 then performs each of the scripts 82 on source column 74 and determines whether each element output by each script 82 is in the target column 76. This determination is best illustrated by showing the joined tables 66 that would result from joining the first table 40 and the second table 42 using each of the scripts 82.

The table produced by joining the first table 40 and the second table 42 using the first script 82 is as follows.

| Roll Number (integer) | GPA (real) | GPA (integer) | Grade (string) |
|---|---|---|---|
| 1 | 4.1 | 1 | 'A' |
| 2 | 3.5 | 5 | |

Applying the first script 82 to the element "3.5" in the source column 74 produces an output, "5," that is not an element of the target column 76. The second table 42 does not contain a row in which GPA has the value of "5," so the joined table 66 does not have a corresponding value of grade in the second row.

The table produced by joining the first table 40 and the second table 42 using the second script 82 is as follows.

| Roll Number (integer) | GPA (real) | GPA (integer) | Grade (string) |
|---|---|---|---|
| 1 | 4.1 | 4 | 'A' |
| 2 | 3.5 | 3 | 'B' |

All the elements output by the second script 82 when it is performed on the source column 74 are elements of the target column 76. "4.1, 4" is therefore the input-output selected pair 100 out of the plurality of input-output selected pairs 100 for which the generated output of the script 104 produced using that pair meets a selected matching criterion when compared to the elements in the target column 76. The script 82 generated from the example pair 102 "4.1, 4" is the closest-fitting script 104, and the predictive formatting module 54 conveys it for display to the user.

According to another alternative, the predictive formatting module 54 may instead determine which script 104 produces the output that meets a selected matching criterion when compared to the element in the target column 76 using a point system. For example, points may be assigned to outputs based on the number of outputs that belong to the target column 76, and their coverage of the elements in the target column 76. The output with the most points may be chosen as the suggested join operation 62.

For the script 104 for which the generated output meets a selected matching criterion when compared to the elements of the target column 76, the predictive formatting module 54 conveys the output generated by that script 104 for display on a display device 96 in the graphical user interface 68. The outputs of lower-ranking scripts may also be conveyed for display to the user as suggested join operations 62. In response to an input signal from the user accepting the script 104 with output conveyed for display in the suggested join operation 62, the predictive formatting module 54 performs a join operation on the two tables 44 at least in part by performing the conveyed script 82 on the source column 74.

While the process of joining two tables 44 may be initiated by the user, the application program 86 may also compute the join potential of tables 44 without prompting from the user, and convey join suggestions 62 for display to the user when it computes a high join potential between two or more tables 44. If it does so, the application program 86 may use profiles that contain information about the elements of tables 44 and the formats of those elements. Using these profiles, the application program 86 may determine a level of similarity between two or more tables 44 and determine the likelihood of a successful join operation.

The predictive formatting module 54 may be configured to generate a profile for each column in the first table 40 and each column in the second table 42. The profile of each column may include one or more of a minimum string length, maximum string length, mean string length, data types of the elements of the column, and delimiters contained within the elements of the column. The predictive formatting module 54 may use the profiles of each column in the first table 40 and each column in the second table 42 to determine a probability of a successful join operation between the columns.

The use of column profiles to determine the probability of successful join operations between columns can allow the predictive formatting module 54 to compute the join potential of tables 44 more quickly. By comparing column profiles, the predictive formatting module 54 may rule out pairs of columns with low join potential without having to determine the longest substring matches between elements of those columns. Since column profiles may be determined and compared more quickly than the longest substring matches between the elements of each pair of columns, the use of column profiles can save computing time when determining the probability of successful join operations between columns.

Two examples of the use of column profiles to determine the probability of a successful join operation between two columns are provided below. In the first example, column profiles are used to determine that the probability of a successful join operation between two columns is low even though the pair of the plurality of pairs of converted strings with the longest substring match is produced from the elements of those two columns. In the second example, column profiles are used to determine that the probability of a successful join operation between two columns is high even though the pair of the plurality of pairs of converted strings with the longest substring match is not produced from the elements of those two columns.

In the first example, the columns of the first table 40 are Name (string) and Address. The columns of the second table 42 are Name (string) and Telephone Number. The tables 44 are as follows.

| Name (string) | Address |
|---|---|
| 'Jacob Burnside' | 2414 Cedar St. |
| 'Jane Smith' | 511 E. Burnside |

| Name (string) | Telephone Number |
|---|---|
| 'Jacob E. Burnside' | 555-337-1220 |
| 'Jane P. Smith' | 555-942-0306 |

In this example, if the elements of each column of each table are converted into converted strings, the longest substring match is between the converted strings '511 E. Burnside' and 'Jacob E. Burnside.' However, a join operation performed with the Address column of the first table 40 and the Name (string) column of the second table 42 would not be successful.

Before the predictive formatting module 54 determines the longest substring match between two converted strings, the predictive formatting module 54 generates a column profile for each column. The profile of each column may include one or more of a minimum string length, maximum string length, mean string length, data types of the elements of the column, and delimiters contained within the elements of the column. In this example, the profiles of the columns include at least the data types of the elements of the columns and the delimiters contained within the elements of the columns.

The elements of the Address column of the first table 40 and the Name (string) column of the second table 42 do not have the same data type. The elements of the Address column of the first table 40 have the address data type, whereas the elements of the Name (string) column have the string data type.

In addition, the elements of the two columns do not contain the same delimiters. The elements of the Address column of the first table 40 each contain two spaces and a period. In one element of the Address column, the period comes at the end of the element, and in the other element of the Address column, it comes before the second space. In the Name (string) column of the second table 42, on the other hand, both elements begin with a left single quotation mark and end with a right single quotation mark. Each element of the Name (string) column contains two spaces and a period, but the period comes before the second space in both elements of the Name (string) column, rather than only in one.

Due to the dissimilarities in the profiles of the Address column of the first table 40 and the Name (string) column of the second table 42, the predictive formatting module 54 may determine that the probability of a successful join operation between the two columns is low without needing to determine the longest substring match between two elements for each pair of columns. The predictive formatting module 54 may save computing time by determining that the probability of a successful join operation between the Address column of the first table 40 and the Name (string) column of the second table 42 is low.

In the second example, the columns of the first table 40 are Event Number (integer) and Date, and the columns of the second table 42 are Date and Time. In the Date column of the first table 40 the delimiters are hyphens, whereas in the Date column of the second table 42, the delimiters are slashes. The tables are as follows.

| Event Number (integer) | Date |
|---|---|
| 1 | 10-03-16 |
| 2 | 10-04-16 |

| Date | Time |
|---|---|
| 10/03/16 | 12:10 |
| 10/04/16 | 11:04 |

In this example, if the elements of each column are converted into converted strings, then seven converted string pairs generated from an element in the first table 40 and an element in the second table 42 are tied for the longest substring match (two characters in length). It may take more computing time than would be desirable for the programming-by-example algorithm 80 to generate and test scripts 82 for seven pairs of converted strings.

Instead of inputting seven input-output selected pairs 100 into the programming-by-example algorithm 80, the predictive formatting module 54 may reduce the number of input-output selected pairs 100 by using column profiles to determine the probability of a successful join operation for each pair of columns. In this example, the column profiles include at least the data types of the elements of the columns, the delimiters contained within the elements, and the mean string lengths of the elements when they are converted into converted strings.

The elements of the Date column of the first table 40 and the elements of the Date column of the second table 42 both have the date data type. When the elements of the Date column of the first table 40 and the elements of the Date column of the second table 42 are converted into converted strings, they also have the same mean string length. In addition, the converted strings generated from the elements of the Date column of the first table 40 and the elements of the Date column of the second table 42 all contain delimiters as their third and sixth elements. These three similarities between the profiles of the Date column of the first table 40 and the Date column of the second table 42 indicate that the probability of a successful join operation between the two columns is high.

The predictive formatting module 54 may programmatically pre-compute one or more possible join operations. The possible join operations may be computed without input from the user. If the probability of a successful join operation surpasses some predetermined threshold, the predictive formatting module 54 may convey a join suggestion 62 for display to the user. If the predictive formatting module 54 performs a join operation, the performed join operation may be one of the one or more possible join operations that the predictive formatting module 54 programmatically pre-computed.

The computing device 90 may include a display 96 that displays a user interface 68 including the possible join operations 62. The computing device 90 may also include a user input device 98 configured to receive a join selection input indicating a selected join operation. The predictive formatting module 54 may perform the selected join operation upon receiving the join selection input.

An example use of the present disclosure is provided below. In this example, the predictive formatting module 54 joins two tables 44 of information about students in a class. The columns of the first table 40 are Roll Number (string), Person Name (string), and DOB (date). The columns of the second table 42 are Roll Number (integer), Address, and City (string). In the first table 40, the Roll Number is a string, whereas in the second table 42 it is an integer. The Roll Number (string) column in the first table 40 is the source column 74 and the Roll Number (integer) column in the second table 42 is the target column 76.

| Roll Number (string) | Person Name (string) | DOB (date) |
|---|---|---|
| '1' | 'John Smith' | 01/01/1980 |
| '2' | 'Jane Smith' | 02/01/1980 |

| Roll Number (integer) | Address | City |
|---|---|---|
| 1 | 12845, Famous Street | 'Bothell' |
| 1 | 12346, Famous Street | 'Bothell' |
| 2 | 2345, 15$^{th}$ Street SE | 'Bellevue' |
| 2 | 5432, 15$^{th}$ Street SE | 'Bellevue' |

Despite the difference in format between the entries in the two columns, the predictive formatting module 54 is able to join the tables 44 by converting the elements of the source column 74 and the target column 76 into converted strings. The predictive formatting module 54 may then determine that the converted strings produced from the elements of the source column 74 contain common substrings with the converted strings produced from the elements of the target column 76. The predictive formatting module 54 may also determine that the converted strings share other characteristics that increase the probability of a successful join operation, such as string length.

The predictive formatting module 54 generates a joined table 66 from the first table 40 and the second table 42. When the tables 44 are joined, the predictive formatting module 54 forms the rows of the joined table 66 from rows of the first table 40 and rows of the second table 42 that have the same Roll Number. The joined table 66 includes both a column in which Roll Number is an integer and a column in which Roll Number is a string. By including Roll Number columns with both formats, the predictive formatting module 54 gives the user a choice of which data type to use when manipulating or referring to the joined table 66 after the predictive formatting module 54 has generated it.

| Roll Number (integer) | Address | City | Roll Number (string) | Person Name (string) | DOB (date) |
|---|---|---|---|---|---|
| 1 | 12345, Famous Street | 'Bothell' | '1' | John Smith | 01/01/1980 |
| 1 | 12346, Famous Street | 'Bothell' | '1' | John Smith | 01/01/1980 |
| 2 | 2345, 15$^{th}$ Street SE | 'Bellevue' | '2' | Jane Smith | 02/01/1980 |
| 2 | 5432, 15$^{th}$ Street SE | 'Bellevue' | '2' | Jane Smith | 02/01/1980 |

Figure 4:
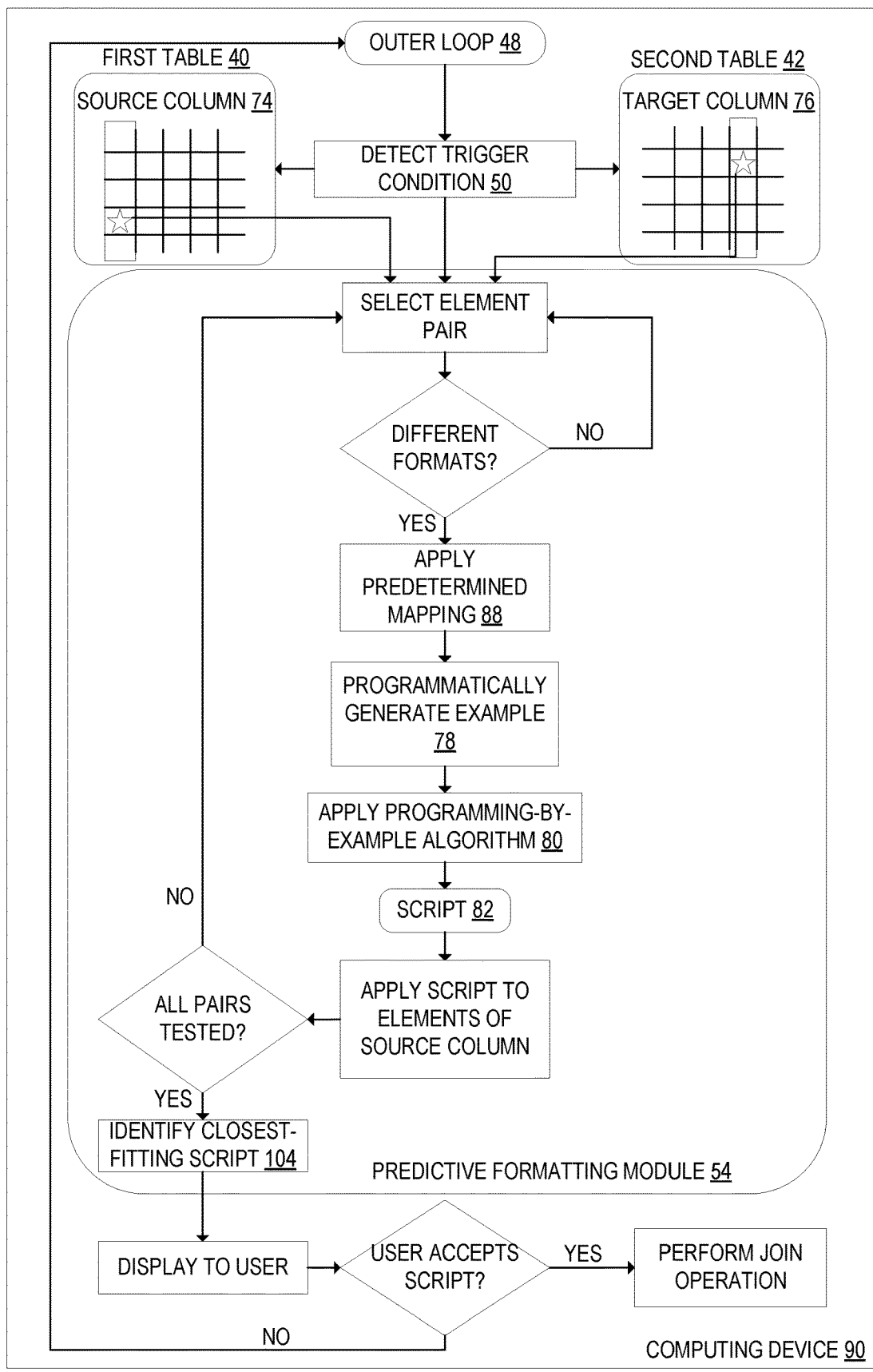
FIG. 4 is a flowchart of a method for programmatically computing the join potential between two tables, according to one embodiment of the present disclosure.

FIG. 4 illustrates a method for use with a computing device 90 for computing join potential between a first table 40 and a second table 42. In the method, the computing device 90 may detect a trigger condition 50 for computing join potential between a first table 40 and a second table 42. Detecting the trigger condition 50 may cause the computing device 90 to exit the outer loop 48 and enter the predictive formatting module 54. The trigger condition may be as described above. Once the computing device 90 has entered the predictive formatting module 54, it selects at least one pair of elements. Each selected pair includes an element in a source column 74 of the first table 40 and an element in a target column 76 of the second table 42.

For each selected pair of elements, the predictive formatting module 54 detects that the elements in the pair are in different formats. If the elements are not in different formats, the predictive formatting module 54 may select another pair of elements and determine whether they are in different formats. If the elements are in different formats, then for at least one of the elements, the predictive formatting module 54 applies a predetermined mapping 88 from a first format of a first element in the pair to a common format defined by the predetermined mapping 88. The predictive formatting module 54 then modifies at least one of the elements so that it is in the same format as the other. The predictive formatting module 54 programmatically generates an example 78 that includes the pair of elements after at least one of the elements has been modified.

When the predictive formatting module 54 modifies the at least one of the elements so that it is in the same format as the other, it may make the modification at least in part by converting the pair of elements into a converted pair of strings. The predictive formatting module 54 may determine a pair of the plurality of pairs for which the generated output meets a selected matching criterion when compared to the data in the target column 76. Such a pair may be determined at least in part by determining the converted pair of strings with a longest substring match as compared to other pairs.

At least one of the elements may be modified so that it is in the same format as the other using a common format map. The common format map may take as inputs the format of the element in the source column 74 and the format of the element in the target column 76 and map these inputs to a common format. The common format may be the same as or different from one or both of the formats of the element in the source column 74 and the element in the target column 76.

For each example, the computing device 90 based on the example programmatically generate a script 82 that, when performed on one of the selected elements, produces a value consistent with the other of the selected elements of the example 78. According to one embodiment of the present disclosure, the script 82 may be generated using a programming-by-example algorithm 80 by the method illustrated in FIG. 3 and described above. For each script 82 generated by the programming-by-example algorithm 80, the predictive formatting module 54 may apply that script to other elements in the source column 74 and determine that an output generated by that script 82 is in the target column 76.

Once all the scripts 82 generated by the programming-by-example algorithm 80 have been applied to the source column 74, the predictive formatting module 54 then identifies the script 104 that generates the output most similar to the target column 76. For each script, the programming-by-example algorithm 80 may determine the relative coverage of the elements of the target column 76, the proportion of outputs of the script 82 that match elements of the target column 76. For the script 104 for which the generated output meets a selected matching criterion when compared to the elements of the target column 76, the computing device 90 conveys the output generated by that script for display on a display device 96. The computing device 90 conveys the output for display as a part of the graphical user interface 68 using the display 96. In response to the user accepting the conveyed script 104, the predictive formatting module 54 performs a join operation on the two tables 44 at least in part by performing the conveyed script 104 on the source column 74.

The predictive formatting module 54 may generate a profile for each column in the first table 40 and each column in the second table 42. The profile of each column may include one or more of a minimum string length, maximum string length, mean string length, data types of the elements of the column, and delimiters contained within the elements of the column. The profiles of each column in the first table 40 and each column in the second table 42 may be used to determine a probability of a successful join operation between the columns.

In one example, the predictive formatting module 54 may programmatically pre-compute one or more possible join operations. The possible join operations may be computed without input from the user. If the probability of a successful join operation surpasses some predetermined threshold, the predictive formatting module 54 may convey a join suggestion 62 to the user. If the predictive formatting module 54 performs a join operation, the performed join operation may be one of the one or more possible join operations that the predictive formatting module 54 programmatically pre-computed.

Figure 5:
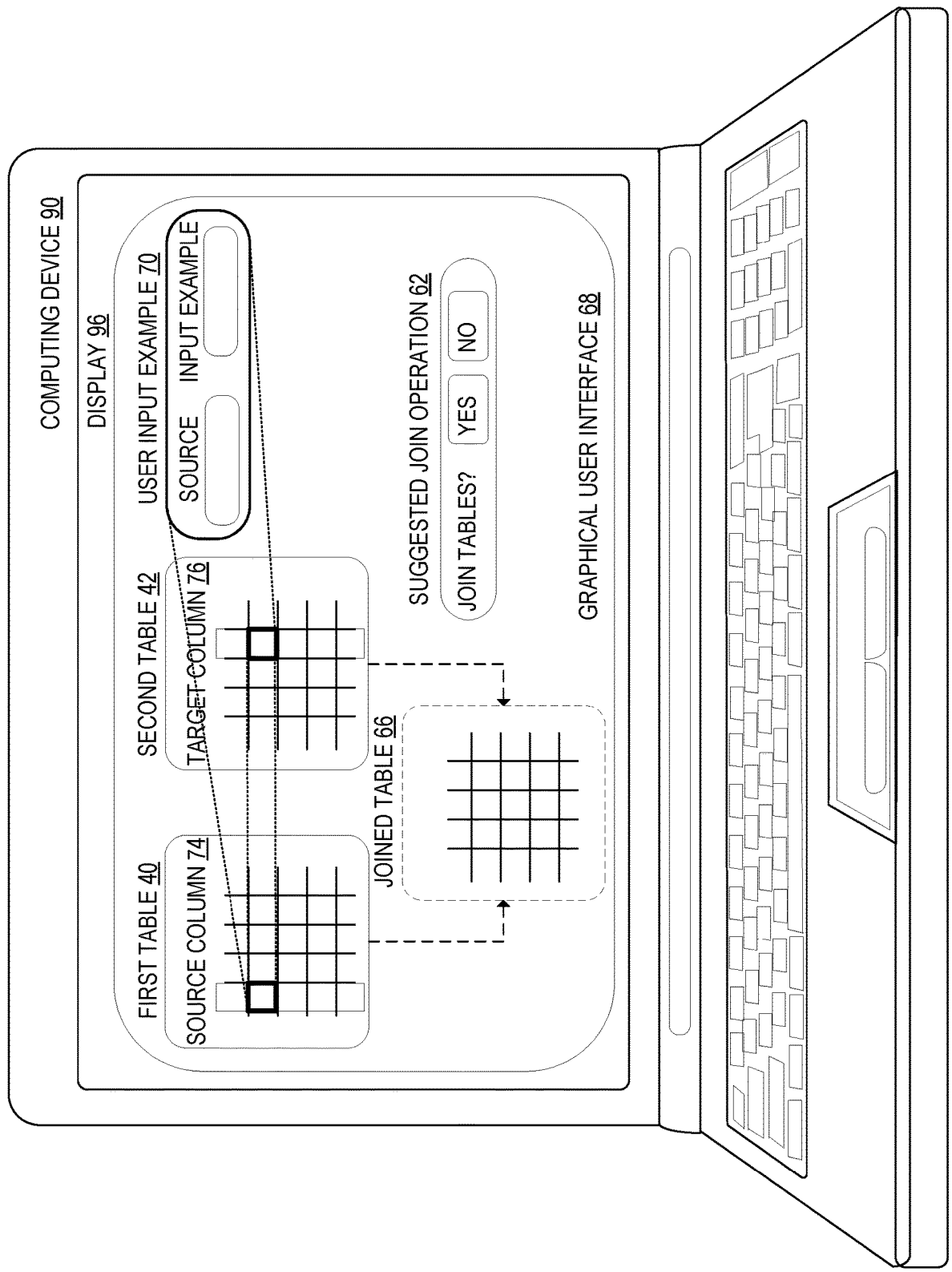
FIG. 5 shows an example computing device configured to execute an application program to compute the join potential between two tables, according to one embodiment of the present disclosure.

FIG. 5 illustrates an example computing device 90 configured to execute an application program 86 that computes the join potential between two tables 44. The computing device may include a display 96 that displays a graphical user interface 68. The graphical user interface 68 may display at least a first table 40 and a second table 42. The graphical user interface 68 may also display a field into which the user can input a user input example 70 for use by the programming-by-example algorithm 80. The user may input the user input example 70 by selecting an input-output pair 100 and modifying at least one element of the pair to produce an input-output example pair 102. Using the input-output selected pair 100 and the input-output example pair 102, the programming-by-example algorithm 80 may produce at least one script 82 that, when applied to the input-output selected pair 100, produces the input-output example pair 102.

Once the predictive formatting module 54 has generated at least one script 82 to join the tables 44, the graphical user interface 68 may display the joined table 66 output by at least one script 82 to the user as a suggested join operation 62. The graphical user interface may indicate that the joined table 66 has not yet been accepted or rejected by the user, for example by displaying it in a different color. The graphical user interface 68 may also display a prompt for the user to either accept or reject the join operation. If the user accepts the join operation, the predictive formatting module 54 may perform the join operation.

In some embodiments, the methods and processes described herein may be tied to a computing system of one or more computing devices. In particular, such methods and processes may be implemented as a computer-application program or service, an application-programming interface (API), a library, and/or other computer-program product.

Figure 6:
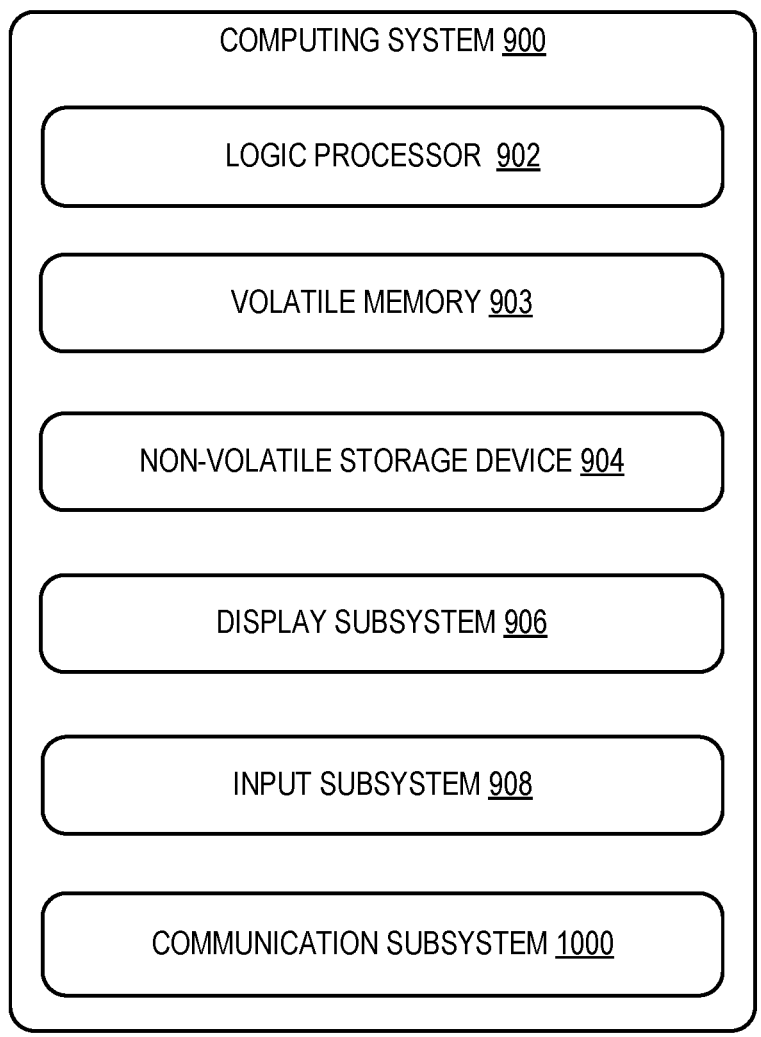
FIG. 6 shows an example computing system according to an embodiment of the present disclosure.

FIG. 6 schematically shows a non-limiting embodiment of a computing system 900 that can enact one or more of the methods and processes described above. Computing system 900 is shown in simplified form. Computing system 900 may embody the computing device 90 of FIG. 1. Computing system 900 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 900 includes a logic processor 902 volatile memory 903, and a non-volatile storage device 904. Computing system 900 may optionally include a display subsystem 906, input subsystem 908, communication subsystem 1000, and/or other components not shown in FIG. 6.

Logic processor 902 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 902 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 904 includes one or more physical devices configured to hold instructions executable by the logic processors to implement the methods and processes described herein. When such methods and processes are implemented, the state of non-volatile storage device 904 may be transformed—e.g., to hold different data.

Non-volatile storage device 904 may include physical devices that are removable and/or built-in. Non-volatile storage device 904 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 904 may include nonvolatile, dynamic, static, read/write, read-only, sequential-access, location-addressable, file-addressable, and/or content-addressable devices. It will be appreciated that non-volatile storage device 904 is configured to hold instructions even when power is cut to the non-volatile storage device 904.

Volatile memory 903 may include physical devices that include random access memory. Volatile memory 903 is typically utilized by logic processor 902 to temporarily store information during processing of software instructions. It will be appreciated that volatile memory 903 typically does not continue to store instructions when power is cut to the volatile memory 903.

Aspects of logic processor 902, volatile memory 903, and non-volatile storage device 904 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 900 typically implemented in software by a processor to perform a particular function using portions of volatile memory, which function involves transformative processing that specially configures the processor to perform the function. Thus, a module, program, or engine may be instantiated via logic processor 902 executing instructions held by non-volatile storage device 904, using portions of volatile memory 903. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 906 may be used to present a visual representation of data held by non-volatile storage device 904. The visual representation may take the form of a graphical user interface (GUI). As the herein described methods and processes change the data held by the non-volatile storage device, and thus transform the state of the non-volatile storage device, the state of display subsystem 906 may likewise be transformed to visually represent changes in the underlying data. Display subsystem 906 may include one or more display devices utilizing virtually any type of technology. Such display devices may be combined with logic processor 902, volatile memory 903, and/or non-volatile storage device 904 in a shared enclosure, or such display devices may be peripheral display devices.

When included, input subsystem 908 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 1000 may be configured to communicatively couple various computing devices described herein with each other, and with other devices. Communication subsystem 1000 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 900 to send and/or receive messages to and/or from other devices via a network such as the Internet.

According to one aspect of the present disclosure, a computing device for computing join potential between a first table and a second table is provided, comprising a processor configured select at least one pair of elements, wherein each pair includes an element in a source column of the first table and an element in a target column of the second table. For each pair, the processor is configured to detect that the elements in the pair are in different formats, for at least one of the elements, apply a predetermined mapping from a first format of a first element in the pair to a common format defined by the predetermined mapping, modify at least one of the elements so that it is in the same format as the other to facilitate generating corresponding matches between the source and target columns, and generate an example that includes the pair of elements after at least one of the elements has been modified. For each example, the processor is configured to, based on the example, programmatically generate a script that, when performed on one of the selected elements, produces a value that is consistent with the other of the selected elements of the example, for each script, apply that script to other elements in the source column and determine that an output generated by that script is in the target column, for the script for which the generated output meets a selected matching criterion when compared to the elements of the target column, convey the output generated by that script for display on a display device, and in response to an input signal accepting the conveyed script, perform a join operation on the two tables at least in part by performing the conveyed script on the source column.

In this aspect, the processor may be configured to compute join potential between the first table and the second table in response to detecting a trigger condition.

In this aspect, the processor may be configured to modify the at least one of the elements so that it is in the same format as the other, at least in part by converting the pair of elements into a converted pair of strings.

In this aspect, the processor may be configured to determine a pair of the plurality of pairs for which the generated output meets a selected matching criterion when compared to the elements in the target column, at least in part by determining that most elements in the generated output belong to the target column and by determining a relative coverage of the elements in the target column.

In this aspect, the processor may be configured to modify at least one of the elements so that it is in the same format as the other using a common format map, wherein the common format map may take as inputs the format of the element in the source column and the format of the element in the target column and may map these inputs to a common format.

In this aspect, the format output by the common format map may be different from the format of the element in the source column and the format of the element in the target column.

In this aspect, the common format may be selected from the group consisting of string representations of formats associated with number, date, time, name, address, email address, and distance.

In this aspect, the processor may be configured to generate a profile for each column in the first table and each column in the second table, wherein the profile of each column may include one or more of a minimum string length, maximum string length, mean string length, data types of the elements of the column, and delimiters contained within the elements of the column.

In this aspect, the processor may be configured to use the profiles of each column in the first table and each column in the second table to determine a probability of a successful join operation between the columns.

In this aspect, the processor may be configured to programmatically pre-compute one or more possible join operations, wherein the performed join operation may be one of the one or more possible join operations.

In this aspect, the computing device may further comprise a display that displays a user interface including the possible join operations and a user input device configured to receive a join selection input indicating a selected join operation, wherein the processor is configured to perform the selected join operation upon receiving the join selection input.

In this aspect, the processor may be configured to programmatically generate the script using a programming-by-example algorithm, wherein the programming-by-example algorithm may be configured to receive an input-output example pair and synthesize a script that, when performed on the input of the example pair, produces the output of the example pair.

In this aspect, the input-output example pair may be input by a user or may be programmatically determined by at least, for at least one element in the source column of the first table, converting that element into a converted string, for at least one element in the target column of the second table, converting that element into a converted string, and determining the converted string in the target column that meets a selected matching criterion when compared to the converted string in the source column, at least in part by determining a pair including the converted string in the source column and the converted string in the target column with a longest substring match.

According to another aspect of the present disclosure, a method for use with a computing device for computing join potential between a first table and a second table is provided, comprising selecting at least one pair of elements, wherein each pair includes an element in a source column of the first table and an element in a target column of the second table. For each pair, the method comprises detecting that the elements in the pair are in different formats, for at least one of the elements, applying a predetermined mapping from a first format of a first element in the pair to a common format defined by the predetermined mapping, modifying at least one of the elements so that it is in the same format as the other to facilitate generating corresponding matches between the source and target columns, and generating an example that includes the pair of elements after at least one of the elements has been modified. For each example, the method comprises, based on the example, programmatically generating a script that, when performed on the selected elements, produces a value that is consistent with the example, for each script, applying that script to other elements in the source column and determining that an output generated by that script is in the target column, for the script for which the generated output meets a selected matching criterion when compared to the elements of the target column, conveying the output generated by that script for display on a display device, and in response to an input signal accepting the conveyed script, performing a join operation on the two tables at least in part by performing the conveyed script on the source column.

In this aspect, the at least one of the elements may be modified so that it is in the same format as the other, at least in part by converting the pair of elements into a converted pair of strings.

In this aspect, a pair of the plurality of pairs for which the generated output meets a selected matching criterion when compared to the data in the target column may be determined at least in part by determining that most elements in the generated output belong to the target column and by determining a relative coverage of the elements in the target column.

In this aspect, at least one of the elements may be modified so that it is in the same format as the other using a common format map, wherein the common format map may take as inputs the format of the element in the source column and the format of the element in the target column and may map these inputs to a common format.

In this aspect, a profile may be generated for each column in the first table and each column in the second table, wherein the profile of each column may include one or more of a minimum string length, maximum string length, mean string length, data types of the elements of the column, and delimiters contained within the elements of the column, and wherein the profiles of each column in the first table and each column in the second table may be used to determine a probability of a successful join operation between the columns.

In this aspect, one or more possible join operations may be programmatically pre-computed, wherein the performed join operation is one of the one or more possible join operations.

According to another embodiment of the present disclosure, a computing device for computing join potential between a first table and a second table is provided, comprising a processor configured to select at least one pair of elements, wherein each pair includes an element in a source column of the first table and an element in a target column of the second table. For each pair, the processor is configured to detect that the elements in the pair are in different formats, for at least one of the elements, apply a predetermined mapping from a first format of a first element in the pair to a common format defined by the predetermined mapping, modify at least one of the elements so that it is in the same format as the other to facilitate generating corresponding matches between the source and target columns, and generate an example that includes the pair of elements after at least one of the elements has been modified. For each example, the processor is configured to, based on the example, programmatically generate a script that, when performed on the selected elements, produces a value that is consistent with the example, for each script, apply that script to other elements in the source column and determine that an output generated by that script is in the target column, for the script for which the generated output meets a selected matching criterion when compared to the elements of the target column, convey the output generated by that script for display on a display device, and in response to an input signal accepting the conveyed script, perform a join operation on the two tables at least in part by performing the conveyed script on the source column. The processor is configured to modify the at least one of the elements so that it is in the same format as the other, at least in part by converting the pair of elements into a converted pair of strings. The processor is configured to determine a pair of the plurality of pairs for which the generated output meets a selected matching criterion when compared to the element in the target column, at least in part by determining that most elements in the generated output belong to the target column and by determining a relative coverage of the elements in the target column. The processor is configured to generate a profile for each column in the first table and each column in the second table, wherein the profile of each column includes one or more of a minimum string length, maximum string length, mean string length, data types of the elements of the column, and delimiters contained within the elements of the column, and use the profiles of each column in the first table and each column in the second table to determine a probability of a successful join operation between the columns.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device for computing join potential between a first table and a second table, comprising:
a processor configured to:
select at least one pair of elements, wherein each pair includes an element in a source column of the first table and an element in a target column of the second table;
for each pair:
detect that the elements in the pair are in different formats;
modify at least one of the elements of the pair using a predetermined mapping so that the at least one of the elements is in the same format as the other element of the pair; and
generate an example pair that includes the pair of elements after at least one of the elements of the pair of elements has been modified with the predetermined mapping to be in the same format as the other element of the pair of elements;
for each example pair, subsequently to applying the predetermined mapping, programmatically generate a script that, when performed on one of the selected elements, produces a value that is consistent with the other of the selected elements of the example pair;
for each script, apply that script to other elements in the source column and determine that an output generated by that script is in the target column;
for the script for which the generated output meets a selected matching criterion when compared to the elements of the target column, convey the output generated by that script for display on a display device; and
in response to an input signal accepting the conveyed script, perform a join operation on the two tables at least in part by performing the conveyed script on the source column, wherein the join operation generates a joined table including the pair of elements as modified by the predetermined mapping.

2. The computing device of claim 1, wherein the processor is configured to compute join potential between the first table and the second table in response to detecting a trigger condition.

3. The computing device of claim 1, wherein the processor is configured to modify the at least one of the elements so that it is in the same format as the other, at least in part by converting the pair of elements into a converted pair of strings.

4. The computing device of claim 3, wherein the processor is configured to determine a pair of the plurality of pairs for which the generated output meets a selected matching criterion when compared to the elements in the target column, at least in part by determining that most elements in the generated output belong to the target column and by determining a relative coverage of the elements in the target column.

5. The computing device of claim 1, wherein the processor is configured to modify at least one of the elements so that it is in the same format as the other using a common format map, wherein the common format map takes as inputs the format of the element in the source column and the format of the element in the target column and maps these inputs to a common format.

6. The computing device of claim 5, wherein the format output by the common format map is different from the format of the element in the source column and the format of the element in the target column.

7. The computing device of claim 1, wherein the common format is selected from the group consisting of string representations of formats associated with number, date, time, name, address, email address, and distance.

8. The computing device of claim 1, wherein the processor is configured to generate a profile for each column in the first table and each column in the second table, wherein the profile of each column includes one or more of a minimum string length, maximum string length, mean string length, data types of the elements of the column, and delimiters contained within the elements of the column.

9. The computing device of claim 8, wherein the processor is configured to use the profiles of each column in the first table and each column in the second table to determine a probability of a successful join operation between the columns.

10. The computing device of claim 1, wherein the processor is configured to programmatically pre-compute one or more possible join operations, and wherein the performed join operation is one of the one or more possible join operations.

11. The computing device of claim 10, further comprising:
a display that displays a user interface including the possible join operations; and
a user input device configured to receive a join selection input indicating a selected join operation;
wherein the processor is configured to perform the selected join operation upon receiving the join selection input.

12. The computing device of claim 1, wherein the processor is configured to programmatically generate the script using a programming-by-example algorithm, wherein the programming-by-example algorithm is configured to:
receive an input-output example pair; and
synthesize a script that, when performed on the input of the input-output example pair, produces the output of the input-output example pair.

13. The computing device of claim 12, wherein the input-output example pair is input by a user or is programmatically determined by at least:
for at least one element in the source column of the first table, converting that element into a converted string;
for at least one element in the target column of the second table, converting that element into a converted string;
determining the converted string in the target column that meets a selected matching criterion when compared to the converted string in the source column, at least in part by determining a pair including the converted string in the source column and the converted string in the target column with a longest substring match.

14. A method for use with a computing device for computing join potential between a first table and a second table, comprising:
selecting at least one pair of elements, wherein each pair includes an element in a source column of the first table and an element in a target column of the second table;
for each pair:
detecting that the elements in the pair are in different formats;
modifying at least one of the elements of the pair using a predetermined mapping so that the at least one of the elements is in the same format as the other element of the pair; and
generating an example pair that includes the pair of elements after at least one of the elements of the pair of elements has been modified with the predetermined mapping to be in the same format as the other element of the pair of elements;
for each example pair, subsequently to applying the predetermined mapping, programmatically generating a script that, when performed on one of the selected elements, produces a value that is consistent with the other of the selected elements of the example pair;
for each script, applying that script to other elements in the source column and determining that an output generated by that script is in the target column;
for the script for which the generated output meets a selected matching criterion when compared to the elements of the target column, conveying the output generated by that script for display on a display device; and
in response to an input signal accepting the conveyed script, performing a join operation on the two tables at least in part by performing the conveyed script on the source column, wherein the join operation generates a joined table including the pair of elements as modified by the predetermined mapping.

15. The method of claim 14, wherein the at least one of the elements is modified so that it is in the same format as the other, at least in part by converting the pair of elements into a converted pair of strings.

16. The method of claim 15, wherein a pair of the plurality of pairs for which the generated output meets a selected matching criterion when compared to the data in the target column is determined at least in part by determining that most elements in the generated output belong to the target column and by determining a relative coverage of the elements in the target column.

17. The method of claim 14, wherein at least one of the elements is modified so that it is in the same format as the other using a common format map, wherein the common format map takes as inputs the format of the element in the source column and the format of the element in the target column and maps these inputs to a common format.

18. The method of claim 14, wherein a profile is generated for each column in the first table and each column in the second table, wherein the profile of each column includes one or more of a minimum string length, maximum string length, mean string length, data types of the elements of the column, and delimiters contained within the elements of the column, and wherein the profiles of each column in the first table and each column in the second table are used to determine a probability of a successful join operation between the columns.

19. The method of claim 14, wherein one or more possible join operations are programmatically pre-computed, and wherein the performed join operation is one of the one or more possible join operations.

20. A computing device for computing join potential between a first table and a second table, comprising:
a processor configured to:
select at least one pair of elements, wherein each pair includes an element in a source column of the first table and an element in a target column of the second table;
for each pair:
detect that the elements in the pair are in different formats;
modify at least one of the elements of the pair using a predetermined mapping so that the at least one of the elements is in the same format as the other element of the pair; and
generate an example pair that includes the pair of elements after at least one of the elements of the pair of elements has been modified with the predetermined mapping to be in the same format as the other element of the pair of elements;
for each example pair, subsequently to applying the predetermined mapping, programmatically generate a script that, when performed on the selected elements, produces a value that is consistent with the example pair;
for each script, apply that script to other elements in the source column and determine that an output generated by that script is in the target column;
for the script for which the generated output meets a selected matching criterion when compared to the elements of the target column, convey the output generated by that script for display on a display device; and in response to an input signal accepting the conveyed script, perform a join operation on the two tables at least in part by performing the conveyed script on the source column;

wherein the processor is configured to modify the at least one of the elements so that it is in the same format as the other, at least in part by converting the pair of elements into a converted pair of strings;

wherein the processor is configured to determine a pair of the plurality of pairs for which the generated output meets a selected matching criterion when compared to the element in the target column, at least in part by determining that most elements in the generated output belong to the target column and by determining a relative coverage of the elements in the target column;

wherein the processor is configured to generate a profile for each column in the first table and each column in the second table, wherein the profile of each column includes one or more of a minimum string length, maximum string length, mean string length, data types of the elements of the column, and delimiters contained within the elements of the column;

wherein the processor is configured to use the profiles of each column in the first table and each column in the second table to determine a probability of a successful join operation between the columns; and wherein the join operation generates a joined table including the pair of elements that have been modified with the predetermined mapping to be in the same format.

* * * * *